United States Patent
Liao

(10) Patent No.: US 10,707,785 B2
(45) Date of Patent: Jul. 7, 2020

(54) SIMPLE RUGGED MOTOR AND COMPRESSORS BUILT THEREBY

(71) Applicant: Pen-Yi Liao, Taoyuan (TW)

(72) Inventor: Pen-Yi Liao, Taoyuan (TW)

( * ) Notice: Subject to any disclaimer, the term of this patent is extended or adjusted under 35 U.S.C. 154(b) by 381 days.

(21) Appl. No.: 15/649,805

(22) Filed: Jul. 14, 2017

(65) Prior Publication Data

US 2019/0020289 A1    Jan. 17, 2019

(51) Int. Cl.

| | |
|---|---|
| *H02N 2/14* | (2006.01) |
| *H02N 2/12* | (2006.01) |
| *H02N 2/04* | (2006.01) |
| *H02N 2/16* | (2006.01) |
| *H02K 1/14* | (2006.01) |
| *H02K 1/24* | (2006.01) |
| *H02K 7/14* | (2006.01) |
| *H02K 7/04* | (2006.01) |
| *H02K 19/10* | (2006.01) |
| *H02K 1/06* | (2006.01) |
| *H02N 2/06* | (2006.01) |
| *H02K 16/02* | (2006.01) |

(52) U.S. Cl.
CPC .............. *H02N 2/142* (2013.01); *H02K 1/06* (2013.01); *H02K 1/148* (2013.01); *H02K 1/246* (2013.01); *H02K 7/04* (2013.01); *H02K 7/14* (2013.01); *H02K 19/103* (2013.01); *H02N 2/046* (2013.01); *H02N 2/126* (2013.01); *H02N 2/163* (2013.01); *H02K 16/02* (2013.01); *H02N 2/062* (2013.01)

(58) Field of Classification Search
CPC ........ H02N 2/142; H02N 2/046; H02N 2/126; H02N 2/163; H02K 1/06; H02K 1/148; H02K 1/246; H02K 7/04; H02K 7/14; H02K 19/103
See application file for complete search history.

(56) References Cited

U.S. PATENT DOCUMENTS

| | | | |
|---|---|---|---|
| 8,089,192 B2* | 1/2012 | Li ............................ | H02K 1/148 310/179 |
| 2012/0104982 A1* | 5/2012 | Ramu ........................ | H02K 1/24 318/400.4 |
| 2018/0294758 A1* | 10/2018 | Pietromonaco .... | H02K 11/0094 |
| 2019/0326842 A1* | 10/2019 | Omekanda ........... | H02K 11/215 |
| 2019/0356257 A1* | 11/2019 | Gopalakrishnan .... | H02P 25/092 |

* cited by examiner

*Primary Examiner* — Bernard Rojas
(74) *Attorney, Agent, or Firm* — Rosenberg, Klein & Lee

(57) ABSTRACT

A simple rugged motor has a stator and a rotor formed by stacked silicon steel sheets operates by having a plurality of major and minor coil windings of the stator individually electrified under signals of a control unit, so as to steadily drive a rotor thereof. The simple rugged motor further has an orbit coupling balance assembly engaging an orbiting scroll for a corresponding fixed scroll disposed in a compression chamber to orbit for air compression, so as to form a scroll compressor. Or the simple rugged motor has a coupling assembly engaging a female screw compressor rotor to compress the air by a rotatable male screw compressor rotor disposed in a compression chamber, so as to form a screw compressor.

5 Claims, 14 Drawing Sheets

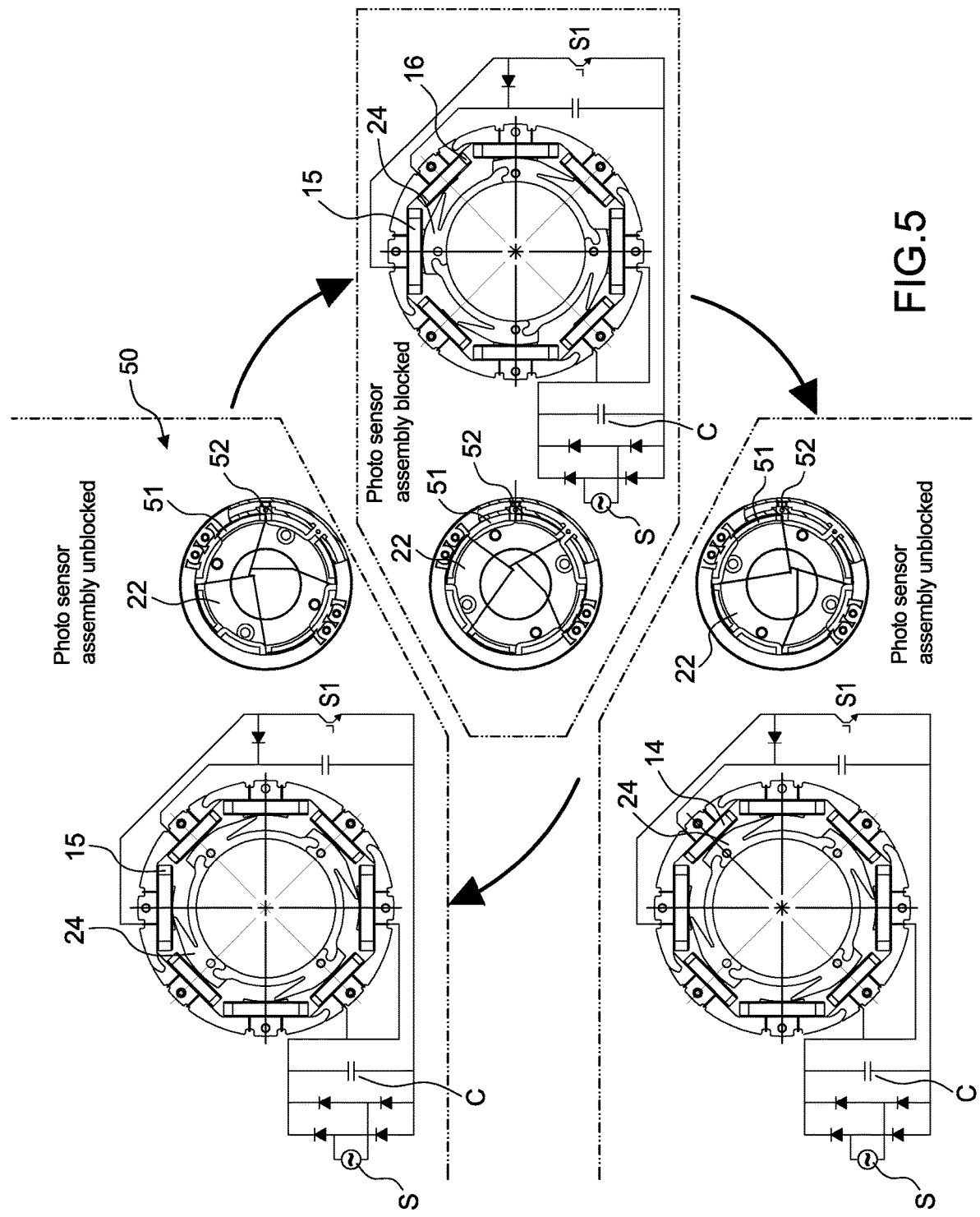

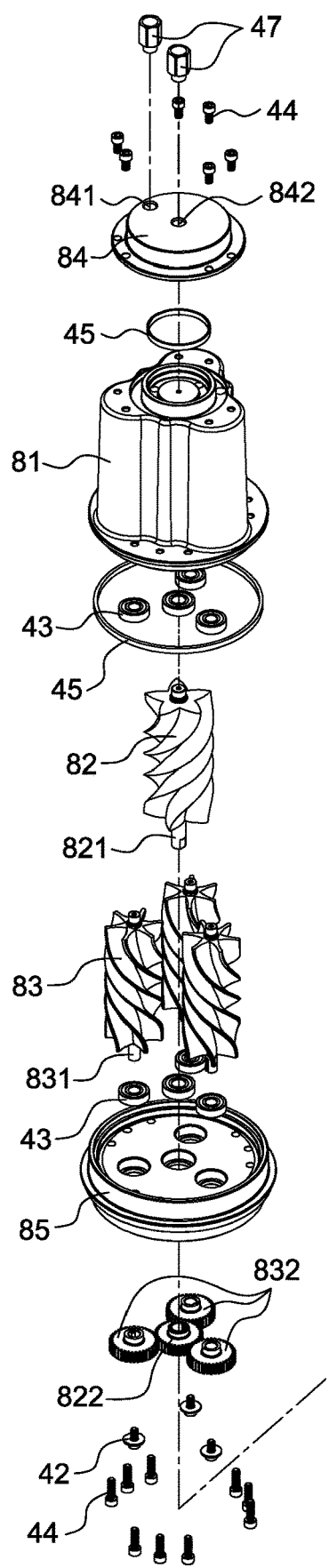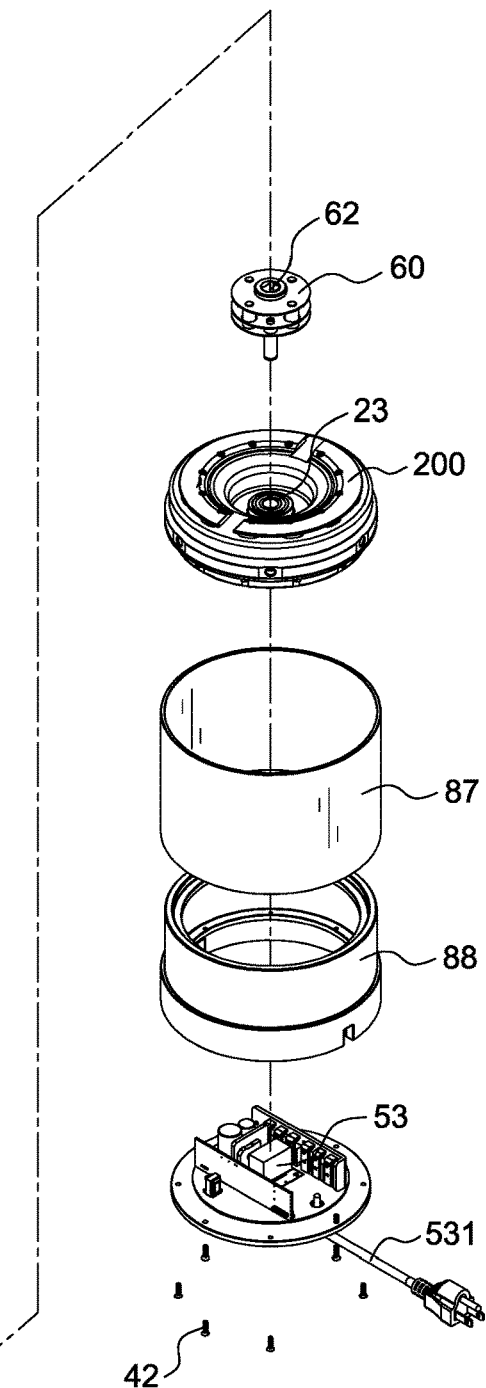
FIG.12

SIMPLE RUGGED MOTOR AND COMPRESSORS BUILT THEREBY

BACKGROUND OF THE INVENTION

1. Field of the Invention

The invention relates to a motor, particularly to one that has a stator wound by coil windings to steadily drive a rotor for rotation. The rotor does not require magnets for operation, thereby reducing volume of the motor for applications to scroll compressors and screw compressors.

2. Description of the Related Art

Reluctance motors are one of electric motors with simple structures. A reluctance motor does not require permanent magnets to produce torque by electronic current reluctance with simple structures. Due to the switched reluctance, motors have torque ripple during operations. But with the micro-electronic control performance being substantially improved, the weak points are overcome, and a switched reluctance motor (SRM) is developed with less prime costs and simpler structures.

Switched reluctance motors have coil windings wound around a stator instead of a rotor, so the electricity is not transferred by brushes or relative components. In other words, the structure of switched reluctance motors is simpler. Also, the rotor of switched reluctance motors does not require permanent magnets for operation, thereby reducing the manufacturing costs as well as the volume of the motors. At the same time, it can operate in high efficiency at higher temperature than other electronic motors since it does not have permanent magnets for operation.

On the other hand, compressors are major equipment for high-pressure gas production, which is commonly applied in the field, and air-conditioners also need compressors for operation. Moreover, compressors can be divided into reciprocating compressors, rotary compressors, screw compressors, and scroll compressors, among which screw compressors and scroll compressors are more stable and efficient with lower noises; therefore they are used more often. Still, if such compressors can be combined with the switched reluctance motors mentioned above, the applications are certainly wider in the field.

SUMMARY OF THE INVENTION

A primary objective of the present invention is to provide a simple rugged motor that has a control unit to switch signals for steadily driving a rotor thereof.

Another objective of the present invention is to provide a simple rugged motor that has a stator and a rotor formed by stacked silicon steel sheets to simplify the manufacturing process and reduce the prime costs.

Yet another objective of the present invention is to provide a simple rugged motor combined with an orbit coupling balance assembly to form a scroll compressor device.

Still another objective of the present invention is to provide a simple rugged motor combined with screw rotors sharing a common axis to form a screw compressor device.

In order to achieve the objectives above, a simple rugged motor with single rotor is built according to the present invention, including the following elements. A stator includes an even number of major magnetic pole arms and an even number of minor magnetic pole arms annularly arranged at an isometric angle to form a space in a center thereof. The number of the minor magnetic pole arms is identical to the number of major magnetic pole arms, and the minor magnetic pole arms are interposed between the major magnetic pole arms. Each magnetic pole arm further has a pole face facing toward said space, each major magnetic pole arm wound by a major coil winding and each minor magnetic pole arm wound by a minor coil winding. A rotor is disposed in the space, including a number of pole teeth annularly arranged at an isometric angle to form a central hole. The number of pole teeth is identical to the number of the major magnetic pole arms; each pole tooth has a surface at a far end from the central hole with a gap formed between each surface and corresponding pole face. A motor top cover is screwed on a top of the stator and a motor bottom cover is screwed on a bottom of the stator. A rotary plate engages in the central hole of the rotor, including an axle hole, at least one bearing engaging in the axle hole of the rotary plate, a motor shaft engaging through the axle hole of the rotary plate and the bearing and having a lower end thereof screwed on the motor bottom cover so that the rotary plate rotates in the space of the stator during operation. A control unit is electrically connected to the stator, including an encoder mask to be driven by the rotary plate for operation, a photo sensor assembly engaging an inner periphery of the stator, and a control circuit connecting the stator to a power source via a switch. The encoder mask controls operation of the photo sensor assembly to produce signals for activating and deactivating. The major coil windings are electrified by the power source when the switch is turned on, and the minor coil windings are electrified by a capacitor when the switch is turned off, thereby the corresponding coil windings produce magnetic fields to keep the rotor and the rotary plate steadily driven.

Furthermore, the major magnetic pole arms, minor magnetic pole arms, and the pole teeth of the rotor are made of a plurality of silicon steel sheets by stacking and engage with each other. An orbit coupling balance assembly is disposed above the space and connected to the rotary plate to form an axis to orbit eccentrically. In addition, an intake chamber is mounted on the orbit coupling balance assembly, including a fixed scroll disposed in the intake chamber and having a compression chamber, an inlet, and a discharge outlet. The compression chamber further includes an orbiting scroll disposed therein and a coupling shaft engaging at a bottom of the orbiting scroll to engage the axis of the orbit coupling balance assembly, thereby the orbiting scroll is rotatably driven by the rotary plate for operations of a scroll compressor.

In order to achieve the objectives mentioned above, another simple rugged motor with dual rotors is built according to the present invention, including the following elements. A stator includes an even number of major magnetic pole arms annularly arranged at an isometric angle to form a space in a center thereof. Each major magnetic pole arm includes an inner pole surface and an outer pole surface and has an inner section wound by a major coil winding and an outer section wound by a minor coil winding. An inner rotor is disposed in the space and includes a plurality of pole teeth annularly arranged at an isometric angle to form a hole at a center thereof. The number of the pole teeth is identical to the number of the major magnetic pole arms, and each pole tooth has an inner surface at a far end from the hole at the center with a gap formed between each inner surface and corresponding inner pole face. An outer rotor engages around an outer periphery of the stator and includes a plurality of pole teeth annularly arranged at an isometric angle; each pole tooth has an outer surface at an end close to the stator with a gap formed between each outer surface and corresponding outer pole face. A motor top cover is screwed on a top of the stator and including an axle hole and a motor bottom cover is screwed on a bottom of the stator and including an axle hole. A rotary plate engages the inner rotor and the outer rotor and includes an axle hole. A motor shaft engages through the axle hole of the rotary plate and has a upper end thereof engaging the axle hole of the motor top cover and a lower end thereof engaging the axle hole of the motor bottom cover for the rotary plate to be fixed in the space of the stator and for the motor shaft to be driven thereby. A control unit is electrically connected to the stator and includes an encoder mask to be driven by the rotary plate for operation, a photo sensor assembly engaging the motor bottom cover, and a control circuit connecting the stator to a power source via a switch. The encoder mask controls operation of the photo sensor assembly to produce signals for activating and deactivating; the major coil windings are electrified by the power source when the switch is turned on and the minor coil windings are electrified by a capacitor when the switch is turned off, thereby the corresponding coil windings produce magnetic fields to keep the inner and outer rotors steadily driven, further driving the rotary plate and the motor shaft steadily.

Moreover, the major magnetic pole arms and the pole teeth of the inner and outer rotors are made of a plurality of silicon steel sheets by stacking. A coupling assembly engages the upper end of the motor shaft and shares a common axis with the motor shaft. In addition, a screw compressor body engages on the coupling and includes a compression chamber, an intake hole, an exhaust hole, a female screw compressor rotor disposed in the compression chamber, and at least one male screw compressor rotor disposed correspondingly to the female screw compressor rotor in the compression chamber. The female screw compressor rotor has a shaft engaging with a driving gear and the axis of the coupling assembly, and the at least one male screw compressor rotor has a shaft engaging with a driven gear meshing with the driving gear, thereby the female and male screw compressor rotors are rotatably driven by the motor shaft for operations of a screw compressor.

With structures disclosed above, the present invention has features described in the following.

1. The present invention has the control unit switching signals to electrify either the major coil windings or the minor coil windings for producing magnetic fields continuously in order to drive the rotor for operation. The rotor does not require magnets for operation and therefore the present invention requires small volume and has little noise during operation.

2. The magnetic arms and the pole teeth of the rotors are built by stacked silicon steel sheets to form the stator and the rotors, featuring a simple manufacturing process and low prime costs.

3. The present invention can further connect to the orbit coupling balance assembly for the orbiting scroll rotatably driven by the rotary plate for repeated operations of air intake, air compression, and air discharging, so as to form a scroll compressor with small volume, less vibration, highly efficient compression process, and low prime costs.

4. The present invention can further connect to the coupling assembly to drive the rotatable female and male screw rotors disposed in the compression chamber in order to repeat the operations of air intake, closing, air compression, and air discharging, so as to form a screw compressor with small volume, less vibration, highly efficient compression process, and low prime costs.

BRIEF DESCRIPTION OF THE DRAWINGS

FIG. 5 is a schematic diagram illustration operation of a control unit of the motor with single rotor;

FIG. 12 is an exploded view of screw compressor according to the present invention.

DETAILED DESCRIPTION OF THE PREFERRED EMBODIMENT

Figure 1:
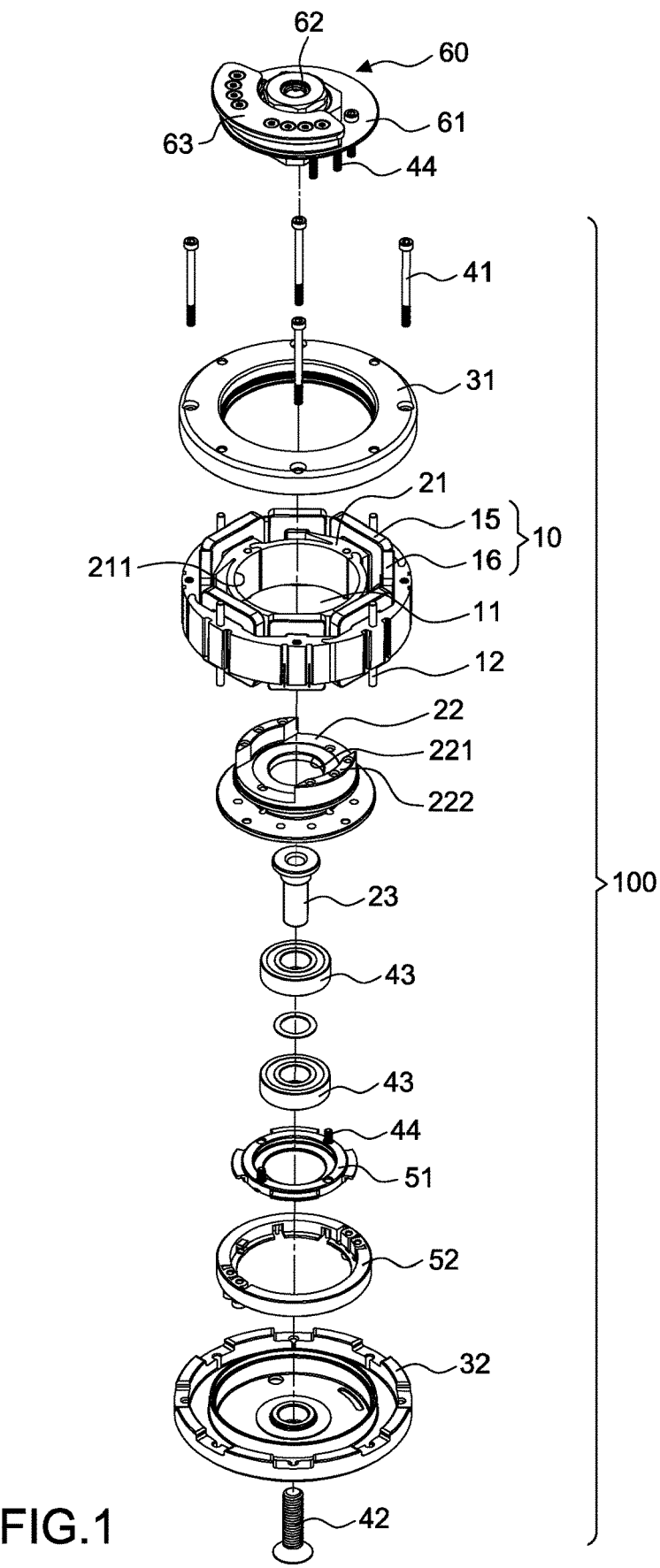
FIG. 1 is an exploded view of a motor with single rotor according to the present invention.
Figure 2:
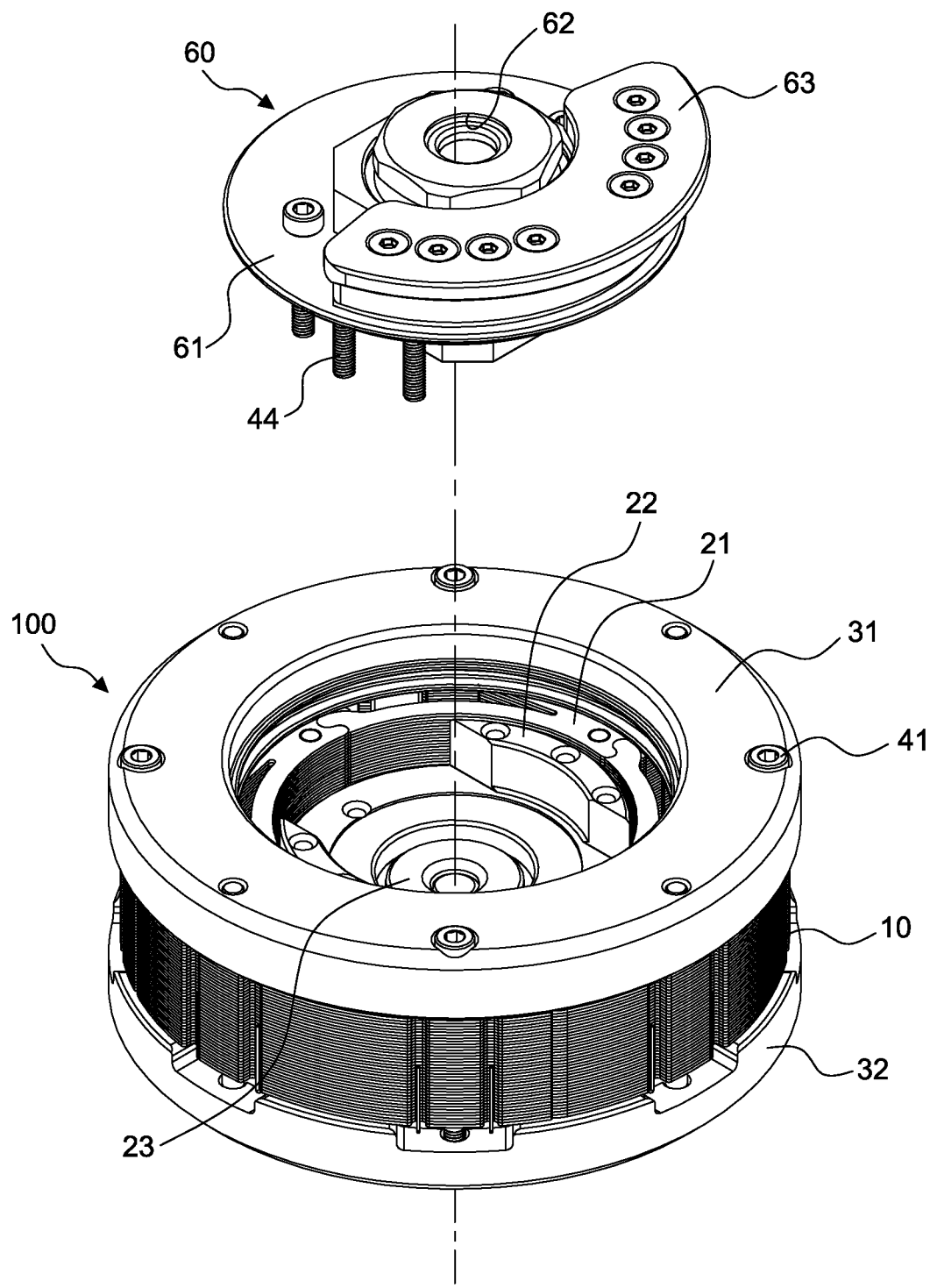
FIG. 2 is a perspective view of FIG. 1.
Figure 3:
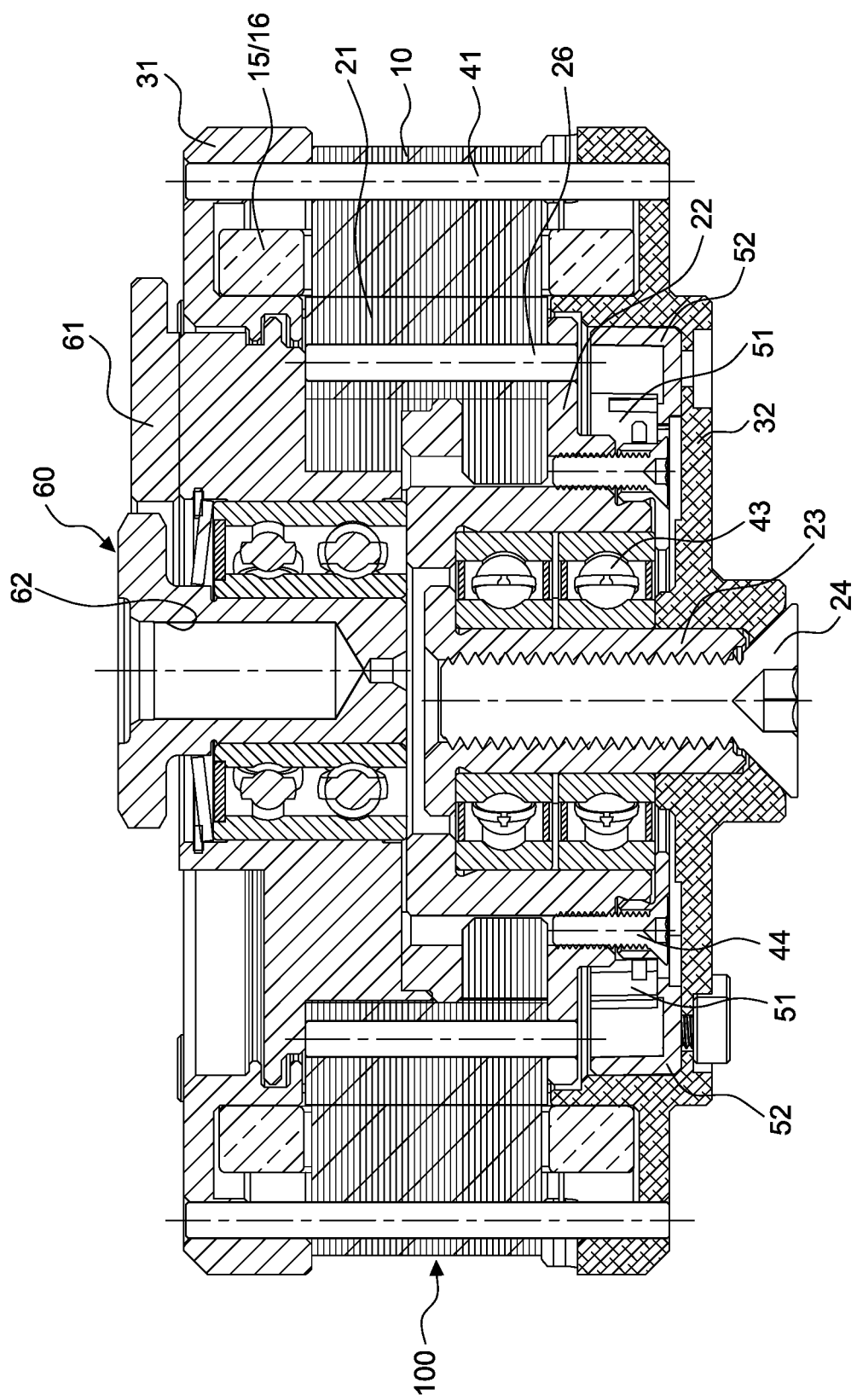
FIG. 3 is a sectional view of the assembled motor with single rotor according to the present invention.

FIGS. 1-3 illustrated structures of a rugged motor with single rotor 100, mainly comprising a stator 10, a rotor 21, a motor top cover 31, a motor bottom cover 32, a rotary plate 22, a motor shaft 23, at least one bearing 43 and a control unit 50.

The stator 10 includes a space 11 surrounded by an even number of major coil windings 15 and an even number of minor coil windings 16. The coil windings 15, 16 are interposed between each other and connected to electric wires 12. The rotor 21 is disposed in the space 11 and rotatably driven by the stator 10. The motor top cover 31 is screwed on a top of the stator 10 and the motor bottom cover 32 screwed on a bottom of the stator 10 by a plurality of screws 41. The rotary plate 22 engages in a central hole 211 of the rotor 21. The motor shaft 23 has an end thereof fixed on the motor bottom cover 32 by a screw 42. In this embodiment, two bearing 43 are engaged through the motor shaft 23 and disposed in an axle hole 221 of the rotary plate 22 to fix the rotary plate 22 in the space 11 for operation. The control unit 50 includes an encoder mask 51 screwed under the rotary plate 22 by screws 44 and a photo sensor assembly 52 disposed on the motor bottom cover 32. When the encoder mask 51 is rotated with the rotary plate 22, the photo sensor assembly 52 is unblocked and blocked repeatedly to produce signals of activating and deactivating.

The rugged motor with single rotor 100 can be further connected to an orbit coupling balance assembly 60; the orbit coupling balance assembly 60 includes a rotary ring 61, an axis 62 and a counterweight element 63. The rotary ring 61 is eccentrically fixed on a protruding seat 222 of the rotary plate 22 by screws 44 so that when the rotary ring 61 rotates with the rotary plate 22, the axis 62 orbits repeatedly.

Figure 4A:
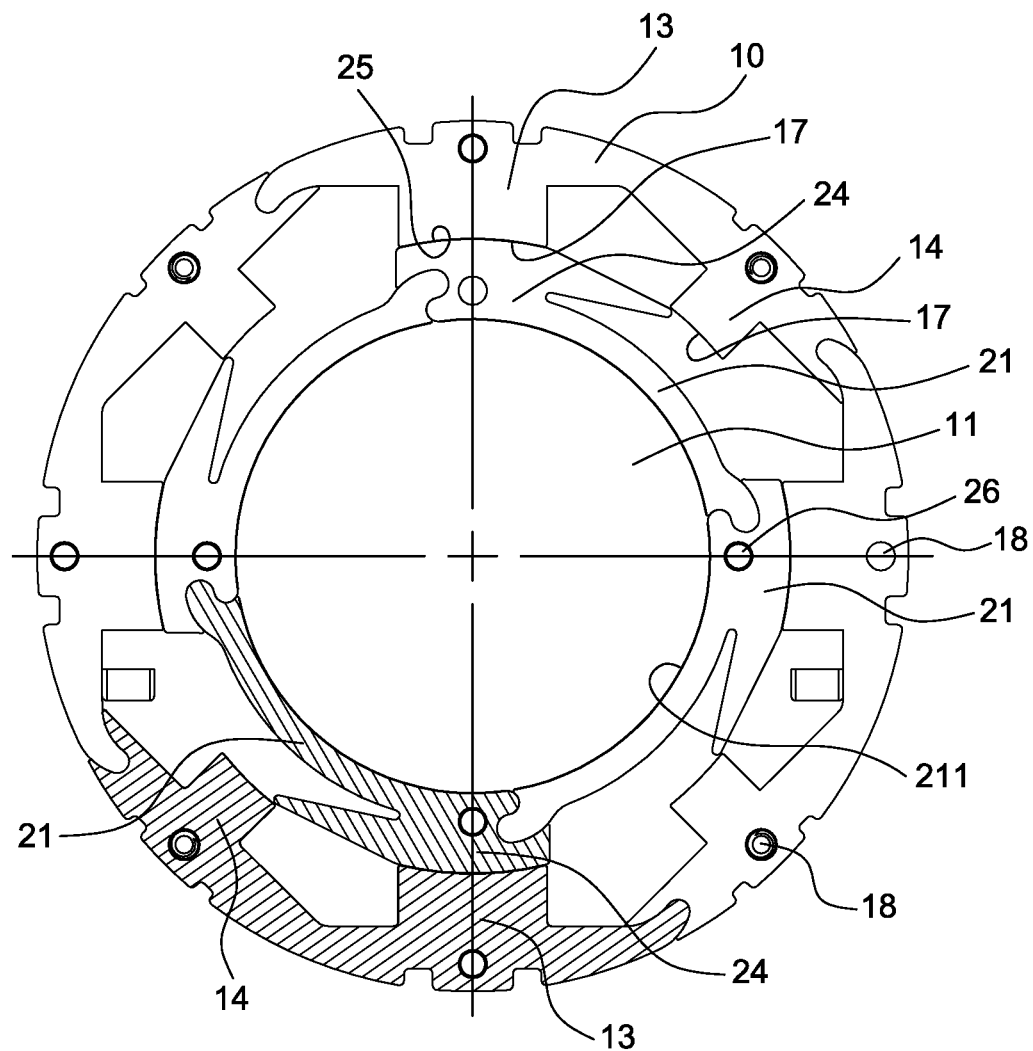
FIG. 4A is a schematic diagram illustrating structure of a stator and a rotor of the assembled motor with single rotor, formed by stacked silicon steel sheets.
Figure 4B:
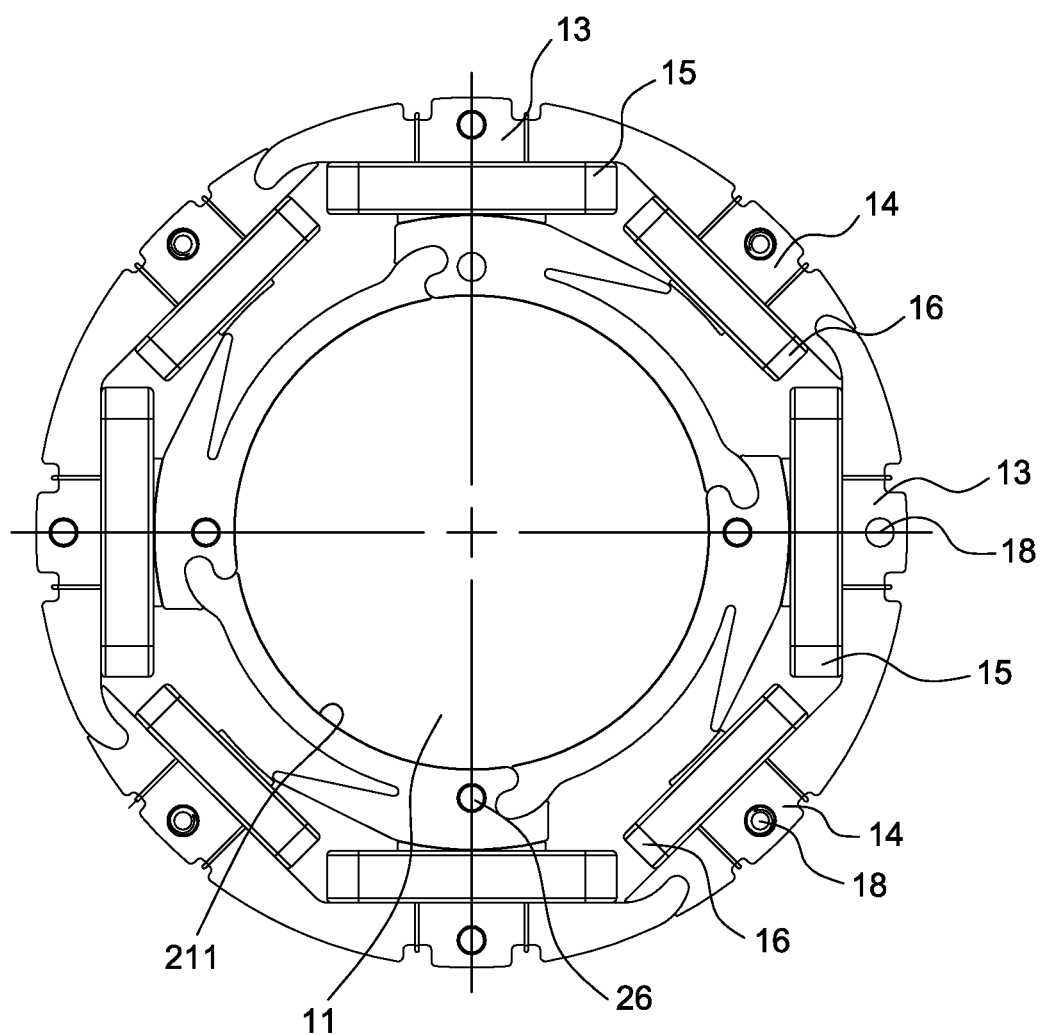
FIG. 4B is another schematic diagram illustrating structure of a stator and a rotor of the assembled motor with single rotor.

Further referring to FIGS. 4A and 4B, the stator 10 includes an even number of major magnetic pole arms 13 annularly disposed at an isometric angle around the space, each wound by a major coil winding 15, and an even number of minor magnetic pole arms 14 interposed between the major magnetic pole arms 13, each wound by a minor coil winding 16. In this embodiment, there are four major magnetic pole arms 13 and four minor magnetic pole arms 14, and each magnetic pole arm has a pole face 17 at an end facing toward the space 11. The rotor 21 is disposed in the space 11 and includes a number of pole teeth 24 equal to the number of the major magnetic pole arms 13. In this embodiment, there are four pole teeth 24 annularly arranged to form the central hole 211, and each pole tooth 24 has a surface 25 at a far end from the central hole 211. A gap is further formed between each surface 25 and pole face 17. The major magnetic pole arms 13, minor magnetic pole arms 14 and the pole teeth 24 of the rotor 21 are made of stacked silicon steel sheets engaged with each other and fixed by a plurality of pins 18, 26 for simpler manufacturing process and lower prime costs.

FIG. 5 illustrated operations of the control unit 50. The control unit 50 is electrically connected to the stator 10 and includes an encoder mask 51 to be rotatably driven by the rotary plate 22, a photo sensor assembly 52, and a control circuit connecting the stator 10 to an AC power S via a switch S1. The AC power S is converted into DC power by a rectifier and the photo sensor assembly 52 is unblocked and blocked by the encoder mask 51 to control the switch S1 for producing signals of activating and deactivating. The present invention uses the pulse-width modulation technique for such operation. When the photo sensor assembly 52 is unblocked by the encoder mask 51 and emits lights therefrom, the switch S1 is turned on and DC power electrifies the major coil windings 15 and charges a capacitor C. Thereby the major coil windings 15 creates a magnetic field to drive the pole teeth 24 of the rotor 21 to rotate until the pole teeth 24 are linearly aligned with the major magnetic pole arms 13. Then the encoder mask 51 blocks out the lights from the photo sensor assembly 52 due to the displacement of the pole teeth 24, turning off the switch S1. The capacitor C electrifies the minor coil windings 16 and produces a magnetic field to drive the pole teeth 24 to rotate again until alignment with the minor coil windings 16. Then the encoder mask 51 unblocks the lights from the photo sensor assembly 52 and turns the switch S1 on again to drive the pole teeth 24 for rotation. With switching of the switch S1, the rotor 21 thereby rotates the rotary plate 22 for operation.

Figure 6:
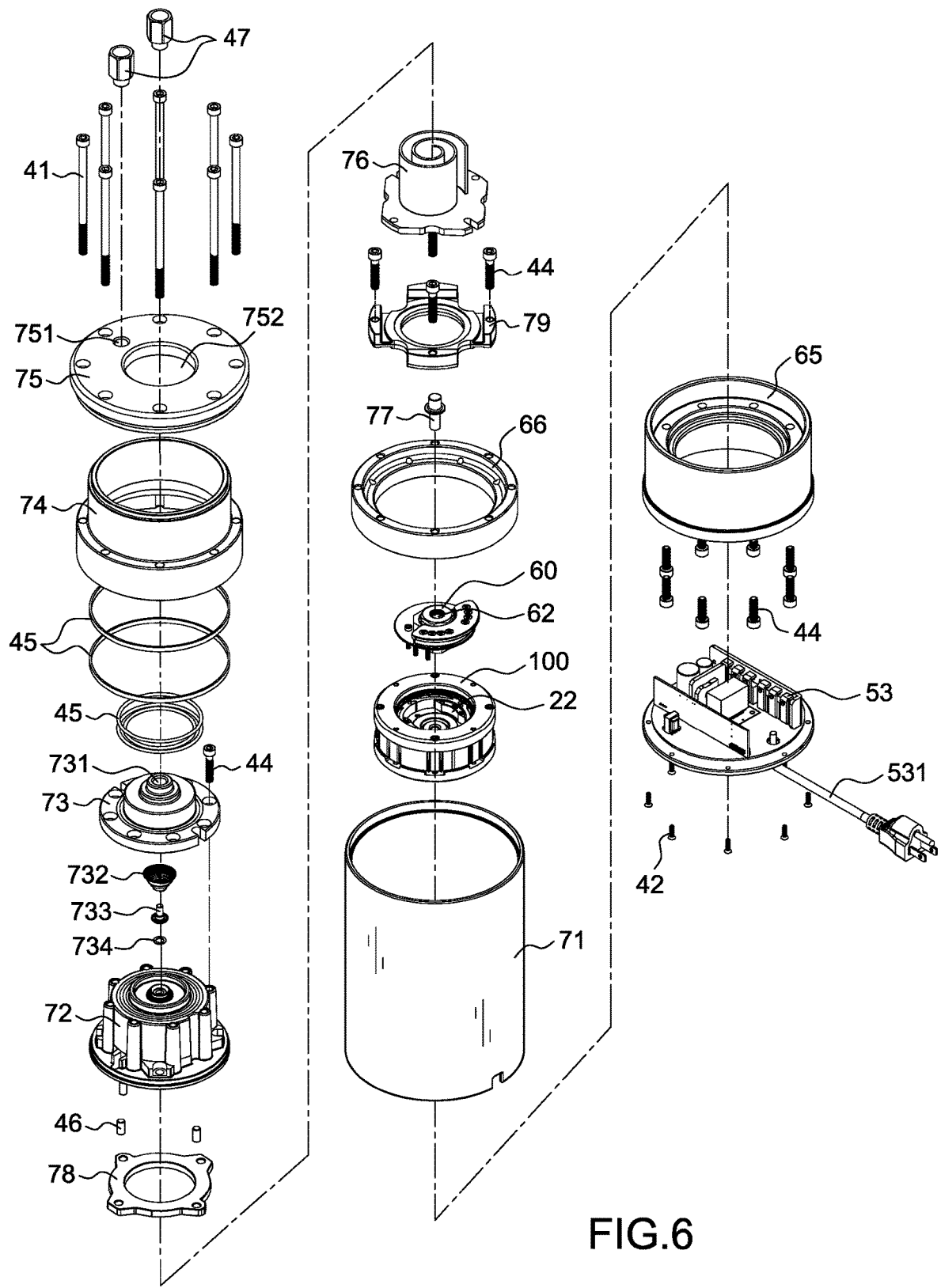
FIG. 6 is an exploded view of a scroll compressor according to the present invention.
Figure 7:
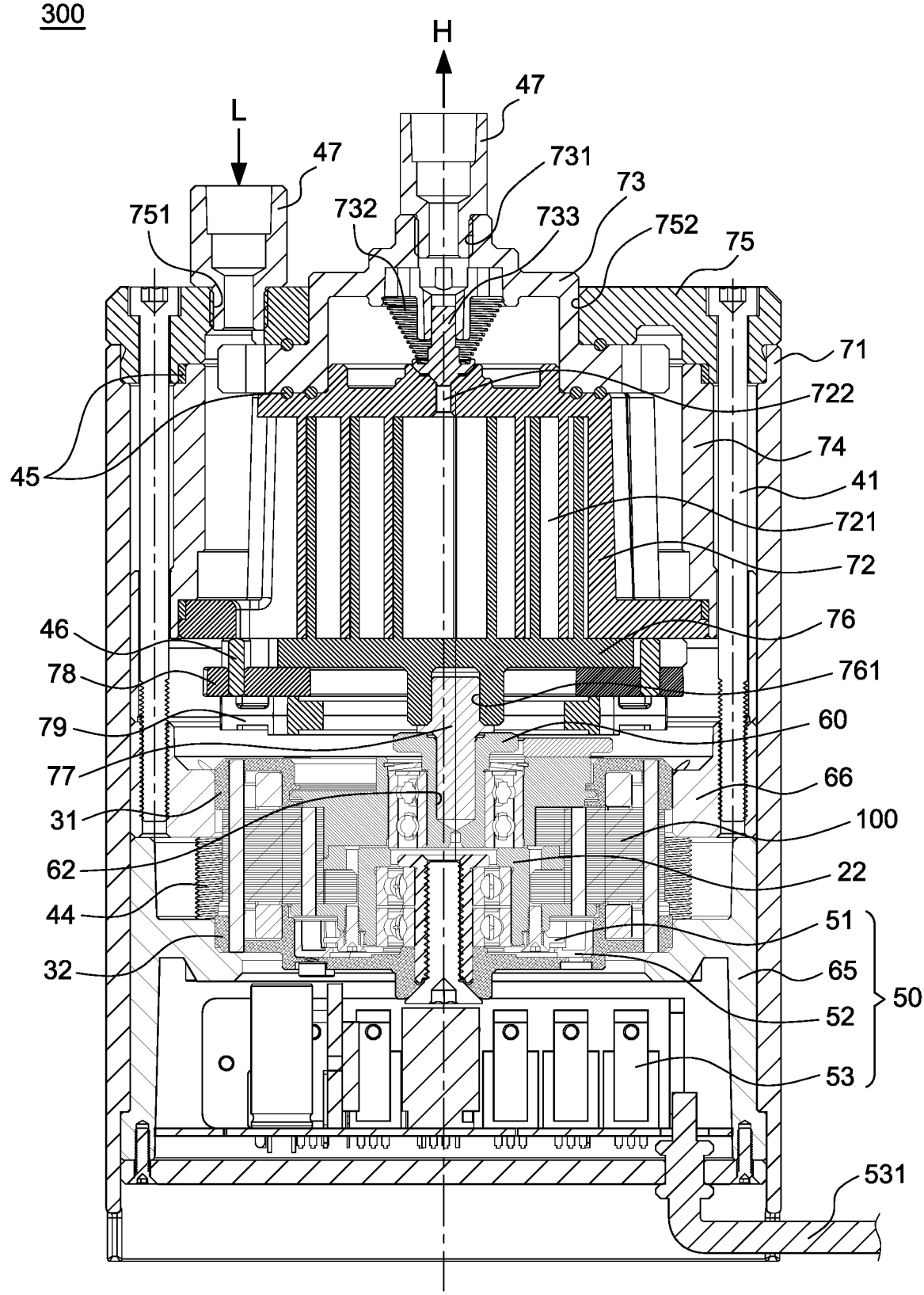
FIG. 7 is a sectional view of the assembled scroll compressor according to the present invention.

With reference to FIGS. 6 and 7, the present invention is combined to form a scroll compressor 300. The scroll compressor 300 comprises a top cover 75, a compressor case 71, a fixed scroll 72, an exhaust cover 73, an orbiting scroll 76, a frame 79, an intake chamber 74, two pipe connectors 47, a fixing frame 66, a coupling shaft 77, a lower seat 65 and a controller 53.

The top cover 75 is disposed on the compressor case 71 and has an intake hole 751 and an engaging hole 752. The fixed scroll 72 includes a compression chamber 721, an inlet (not shown), and a discharge outlet 722. The exhaust cover 73 has an exhaust hole 731 and is fixed on the fixed scroll 72 by screws 44 with an airtight ring 45 disposed in-between to prevent from air leakage. A discharging control unit is disposed between the exhaust hole 731 and the discharge outlet 722, including a spring 732, a check valve spindle 733, and a stopping gasket 734. The orbiting scroll 76 is disposed in the compression chamber 721 and engages with a cross clip ring 78 fixed by a pin 46. The frame 79 is disposed under the orbiting scroll 76 and the cross clip ring 78 and fixed with the fixed scroll 72 by screws 44. The intake chamber 74 engages an outer periphery of the fixed scroll 72 with the airtight ring 45 disposed in-between to prevent from air leakage. The pipe connectors 47 are separately connected to the intake hole 751 and the exhaust hole 731 for guiding low-pressure gas L to the intake chamber 74 from the intake hole 751; then the low-pressure gas L is compressed into high-pressure gas H and discharged from the exhaust hole 731. The assembly is then disposed in the compressor case 71 for the exhaust hole 731 of the exhaust cover 73 engaging through the engaging hole 752 of the top cover 75. Then the fixing frame 66 is disposed under the frame 79 and fixed thereto by screws 41 screwing from the top cover 75 and through the intake chamber 74. The compressor assembly is thereby aligned with a central axis of the compressor case 71. The coupling shaft 77 engages an axle hole 761 of the orbiting scroll 76 with an upper section and engages the axis 62 of the orbit coupling balance assembly 60 with a lower section for assembly. The compressor case 71 is then mounted on the lower seat 65 for the motor bottom cover 32 of the rugged motor with single rotor 100 to engage the lower seat 65 and screwed by screws 44. The controller 53 is disposed under the lower sear 65 with an electric wire 531 and is electrically connected to the stator 10, the encoder mask 51 and the photo sensor assembly 52.

With structures disclosed above, the rugged motor with single rotor 100 has the orbit coupling balance assembly 60 and the coupling shaft 77 to drive the orbiting scroll 76 to orbit repeatedly for the fixed scroll 72 to operate, so as to form a scroll compressor 300 with the rugged motor 100.

Figure 8:
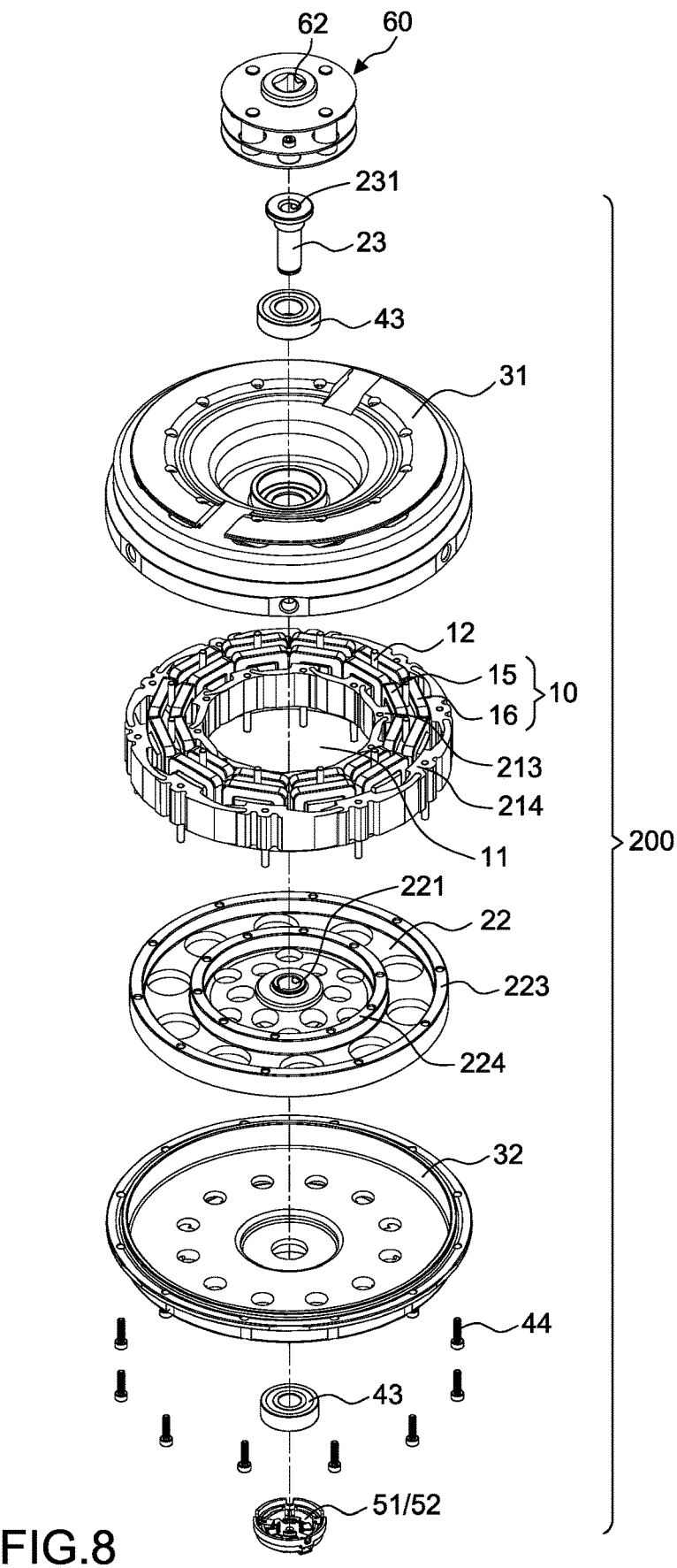
FIG. 8 is an exploded view of a motor with dual rotors according to the present invention.
Figure 9:
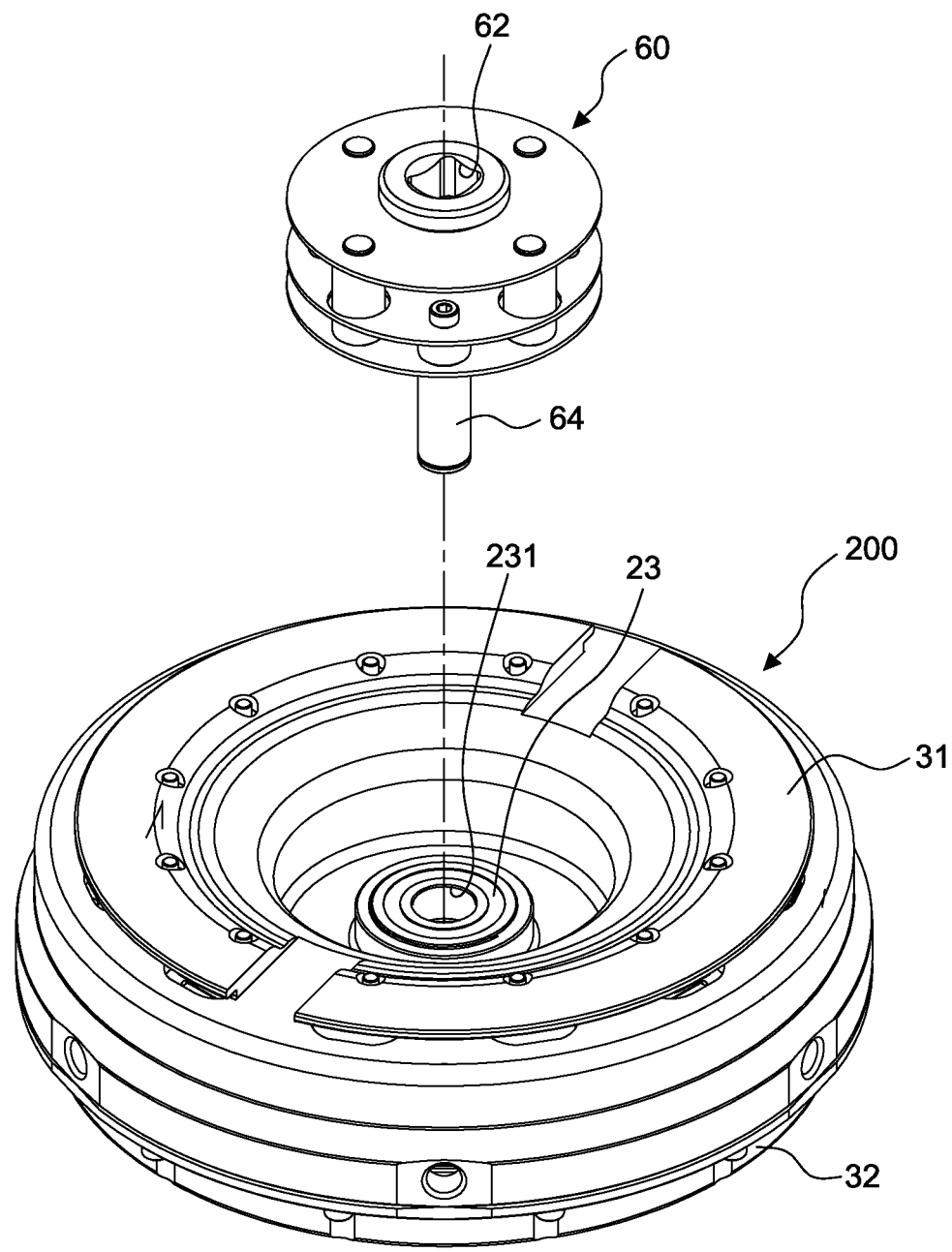
FIG. 9 is a perspective view of FIG. 8.
Figure 10:
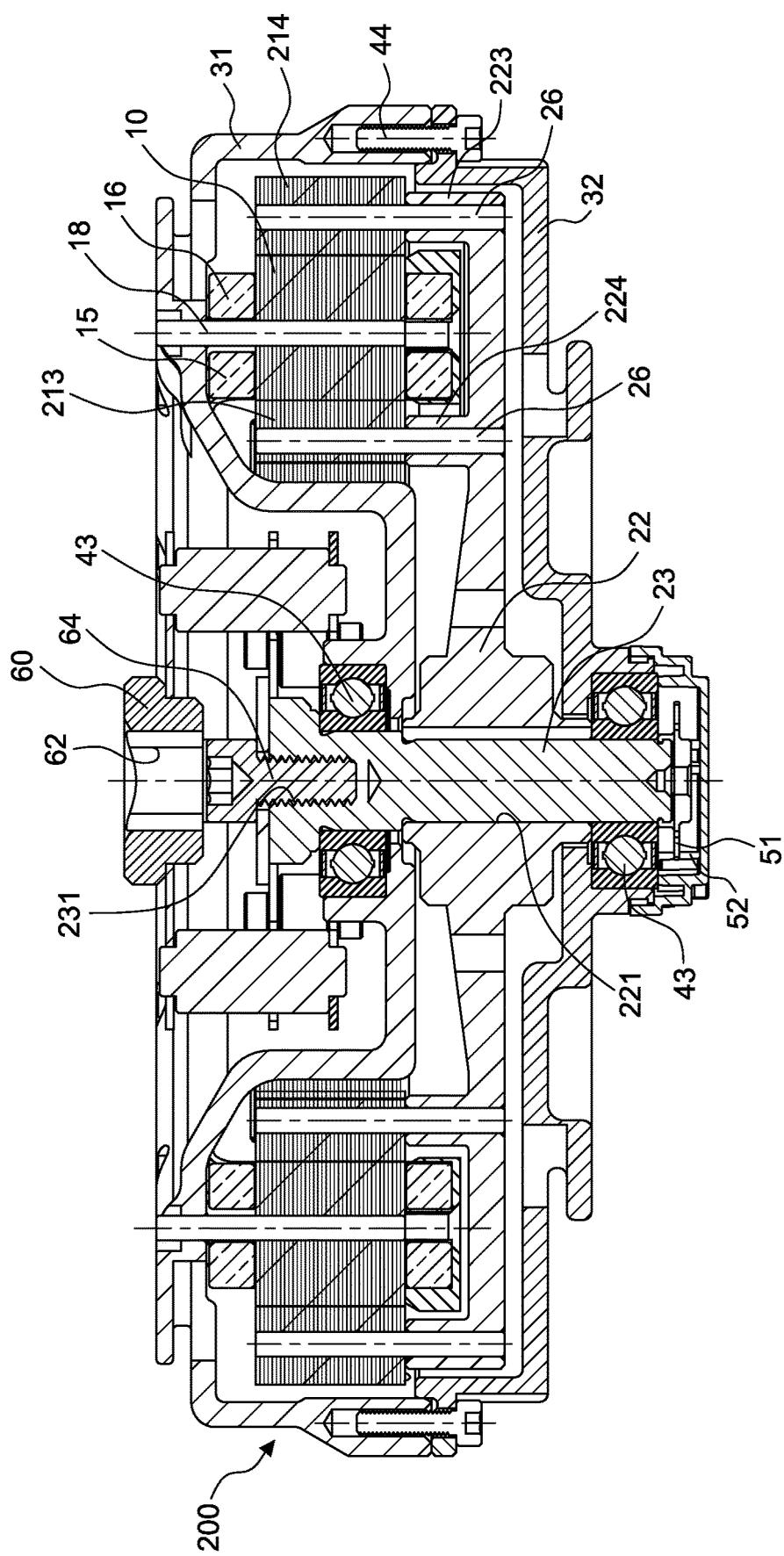
FIG. 10 is a sectional view of the assembled motor with dual rotors according to the present invention.

FIGS. 8-10 illustrated structures of a rugged motor with dual rotors 200, comprising a stator 10, an inner rotor 213, an outer rotor 214, a motor top cover 31, a motor bottom cover 32, a rotary plate 22, a motor shaft 23, two bearings 43, an encoder mask 51, and a photo sensor assembly 52.

The stator 10 includes a space 11 surrounded by an even number of major coil windings 15 and an even number of minor coil windings 16. The coil windings 15, 16 are interposed between each other and connected to electric wires 12. The inner rotor 213 is disposed in the space 11 and the outer rotor 214 is disposed around the stator 10. The rotors 213, 214 are rotatably driven by the stator 10 during operation. The motor top cover 31 is fixed to a top of the stator 10 by a plurality of pins 18 and the motor bottom cover 32 is fixed to a bottom of the stator 10 by a plurality of screws 44. The rotary plate 22 has an outer protruding edge 223, an inner protruding edge 224, and an axle hole 221. The outer protruding edge 223 engages with the outer rotor 214 and is fixed thereto by a plurality of pins 26. The inner protruding edge 224 engages with the inner rotor 213 and is fixed thereto by a plurality of pins 26. The motor shaft 23 has an engaging hole 231 and engages through the axle hole 221 of the rotary plate 22; the motor shat 23 further has an upper section thereof mounted on one of the bearings 43 and has a lower section thereof mounted on the other one, so that it is rotatably driven thereby. The encoder mask 51 engages at the lower end of the motor shaft 23, and the photo sensor assembly 52 is fixed to the motor bottom cover 32, thereby the encoder mask 51 unblocks and blocks the photo sensor assembly 52 to produce signals of activating and deactivating when rotated by the motor shaft 51.

The rugged motor with dual rotors 200 can be further connected to a coupling assembly 60. The coupling assembly 60 includes an axis 62 and a shaft 64. The shaft 64 engages through the engaging hole 231 of the motor shaft 23 for the axis 62 to share a common axis with the motor shaft 23 for operation.

Figure 11:
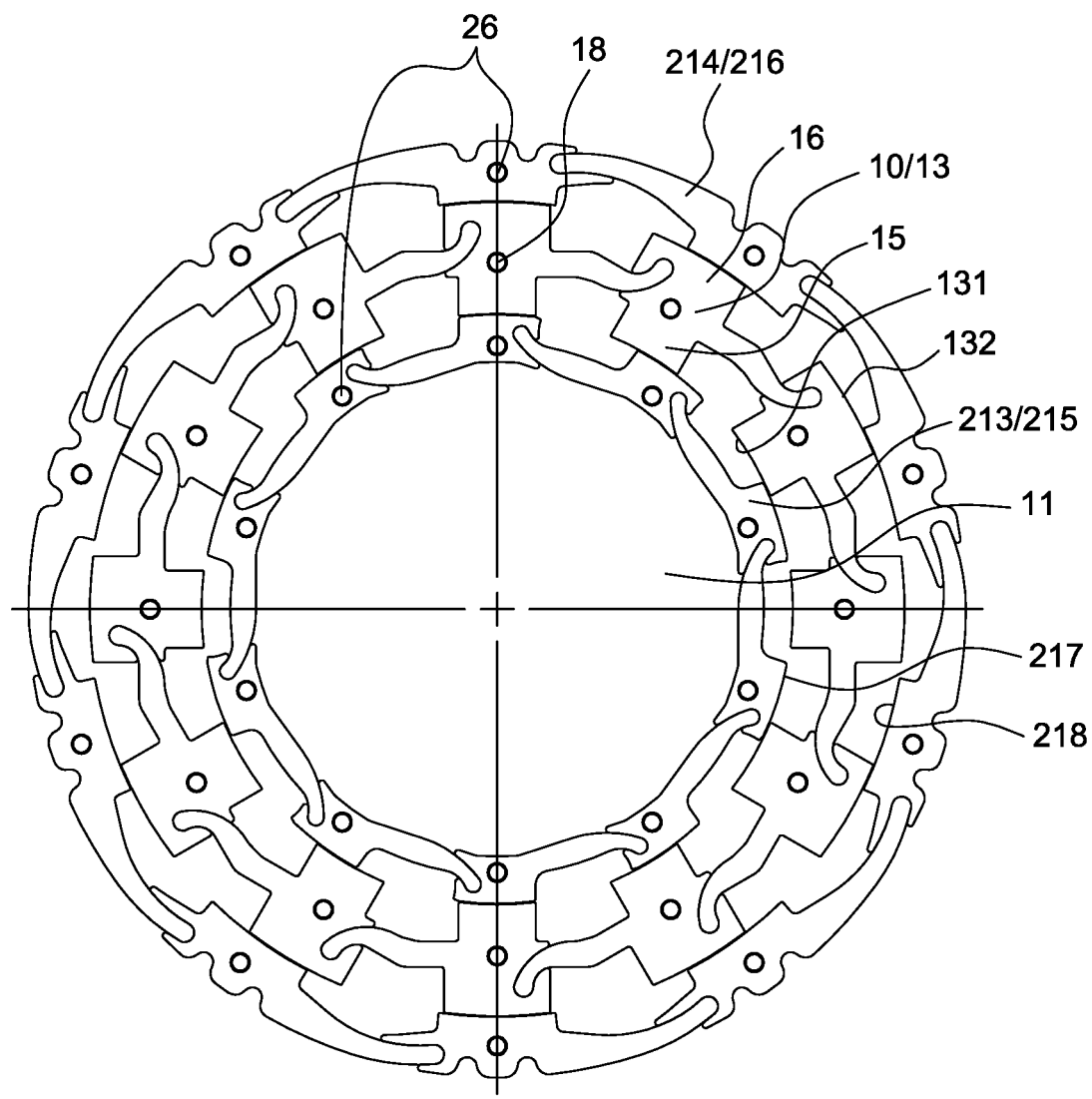
FIG. 11 is a schematic diagram illustrating structure of a stator and two rotors of the motor with dual rotors, formed by stacked silicon steel sheets.

Further referring to FIG. 11, the stator 10 includes an even number of major magnetic pole arms 13 annularly surrounding the space 11 at an isometric angle. In this embodiment, the number of the major magnetic pole arms 13 is twelve. Each major magnetic pole arm 13 has an inner surface 131 an inner end thereof and an outer surface 132 at an outer end thereof; the inner end is further wound by a major coil winding 15 and the outer end is further wound by a minor coil winding 16. The inner rotor 213 is disposed in the space 11 and has a number of pole teeth 215 equal to the number of the major magnetic pole arms 13. The pole teeth 215 of the inner rotor 213 are annularly arranged to form a hole at a center; each pole tooth 215 further has an inner surface 217 at a far end thereof from the hole and a gap is formed between each pole tooth 215 and each inner surface 131 of the major magnetic pole arms 13. The outer rotor 214 is engaged around the stator 10 and includes a number of pole teeth 216 equal to the major magnetic pole arms 13 and annularly arranged. Each pole tooth 216 further has an outer surface 218 facing toward the stator 10 and a gap is formed between each outer surface 218 and each outer surface 132 of the major magnetic pole arms 13. The major magnetic pole arms 13, pole teeth 215 of the inner rotor 213 and pole teeth 216 of the outer rotor 214 are made of stacked silicon steel sheets engaged with each other and fixed by a plurality of pins 18, 26 for simpler manufacturing process and lower prime costs. With structures disclosed above, a difference of the operation between rugged motor with single and dual rotors 100, 200 is that the major coil windings 15 of the rugged motor with dual rotors 200 produce magnetic field to drive the pole teeth 215 of the inner rotor 213 to rotate and the minor coil windings 16 thereof produce magnetic field to drive the pole teeth 216 of the outer rotor 214 to rotate.

Figure 13:
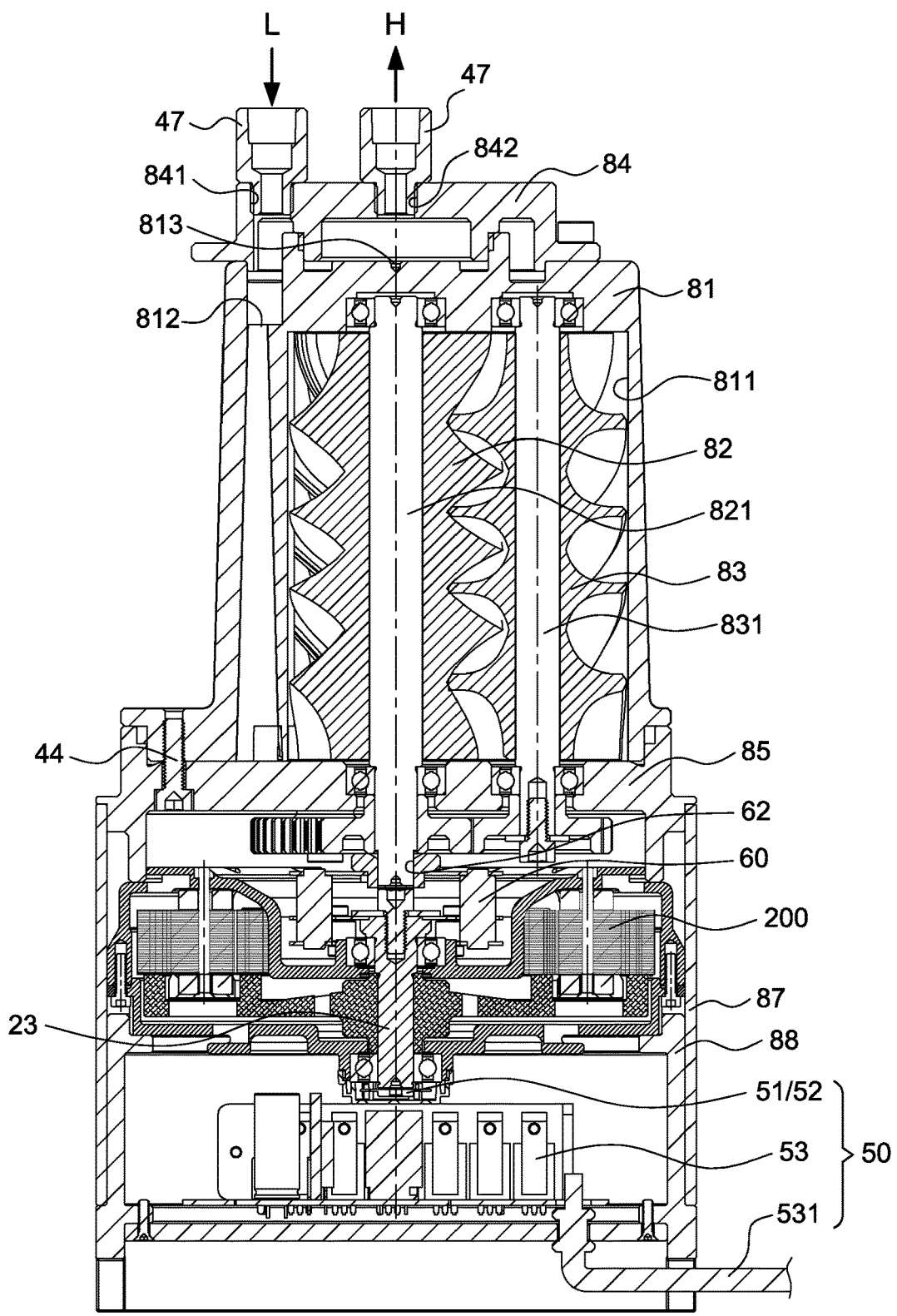
FIG. 13 is a sectional view of the assembled screw compressor.

With reference to FIGS. 12 and 13, the present invention is combined to form a screw compressor 400. The screw compressor comprises structures as following. A compressor body 81 includes a compression chamber 811, an intake hole 812, and an exhaust hole 813. A female screw compressor rotor 82 is disposed in the compression chamber 811, corresponding to at least one male screw compressor rotor 83 in the compression chamber 811. In this embodiment, there are three male screw compressor rotors 83 engaging the female screw compressor rotor 82 in the compression chamber 811 for operation. A cover 84 includes an inlet hole 841 and an outlet hole 842 and is screwed on a top of the compressor body 81 by a plurality of screws 44, and a housing base 85 is screwed on a bottom of the compressor body 81 by the screws 44. An airtight ring 45 is disposed between the compressor body 81 and the cover 84 and between the compressor body 81 and the housing base 85 to prevent from air leakage. The female and male screw compressor rotors 82, 83 each has a shaft 821, 831 engaging a bearing 43 at both ends thereof to be fixed in the compression chamber 811 for rotation. The shaft 821 of the female screw compressor rotor 82 further engages through the housing base 85 and is screwed to a driving gear 822 by a corresponding screw 42; each shaft 831 of the male screw compressor rotors 83 further engages through the housing base 85 and is screwed to a driven gear 832 by a corresponding screw 42. The driving gear 822 and the driven gears 832 are meshing with each other. The inlet hole 841 and the outlet hole 842 each has a pipe connector 47 disposed therein to connect to external pipes for low-pressure gas L to enter the compression chamber 811 via the inlet hole 841 and then to be compressed into high-pressure gas H for discharge from the outlet hole 842. The assembly is then disposed in a compressor case 87 engaging a motor frame 88 for the housing base 85 to engage with a top of the compressor case 87 and for the shaft 821 of the female screw compressor rotor 82 to engage with the axis 62 of the coupling assembly 60. A controller 53 is further disposed under the motor frame 88 with an electric wire 531 electrically connecting the stator 10, the encoder mask 51 and the photo sensor assembly 52. Thereby the rugged motor with dual rotors 200 operates by a common axis shared with the coupling assembly 60 to rotate the screw compressor rotors 82, 83 by the motor shaft 23, so as to perform operation of the screw compressor 400.

What is claimed is:
1. A simple rugged motor with single rotor, comprising:
a stator including an even number of major magnetic pole arms and an even number of minor magnetic pole arms annularly arranged at an isometric angle to form a space in a center thereof, said number of the minor magnetic pole arms being identical to said number of the major magnetic pole arms, and said minor magnetic pole arms interposed between said major magnetic pole arms; each magnetic pole arm further having a pole face facing toward said space, each major magnetic pole arm wound by a major coil winding and each minor magnetic pole arm wound by a minor coil winding;
a rotor disposed in the space and including a number of pole teeth annularly arranged at an isometric angle to form a central hole, the number of pole teeth being identical to the number of the major magnetic pole arms; each pole tooth having a surface at a far end from the central hole with a gap formed between each surface and corresponding pole face;
a motor top cover screwed on a top of the stator;
a motor bottom cover screwed on a bottom of the stator;
a rotary plate engaging in the central hole of the rotor and including an axle hole;
at least one bearing engaging in the axle hole of the rotary plate;
a motor shaft engaging through the axle hole of the rotary plat; and the bearing and having a lower end thereof screwed on the motor bottom cover, the rotary plate thereby rotates in the space of the stator during operation; and
a control unit electrically connected to the stator and including an encoder mask to be driven by the rotary plate for operation, a photo sensor assembly engaging an inner periphery of the stator, and a control circuit connecting the stator to a power source via a switch, said encoder mask controlling operation of said photo sensor assembly to produce signals for activating and deactivating said switch; the major coil windings being electrified by the power source when said switch is turned on and the minor coil windings being electrified by a capacitor when said switch is turned off, thereby the corresponding coil windings produce magnetic fields to keep the rotor and the rotary plate steadily driven.
2. The simple rugged motor with single rotor as claimed in claim 1, wherein the major magnetic pole arms, the minor magnetic pole arms, and the pole teeth of the rotor are made of a plurality of silicon steel sheets by stacking.

3. The simple rugged motor with single rotor as claimed in claim 2, wherein the major and minor magnetic pole arms are formed by stacked silicon steel sheets engaging with each other.

4. The simple rugged motor with single rotor as claimed in claim 1, further comprising an orbit coupling balance assembly disposed above the space and connected to the rotary plate to form an axis to orbit eccentrically.

5. The simple rugged motor with single rotor as claimed in claim 4, further comprising an intake chamber mounted on the orbit coupling balance assembly and including a fixed scroll disposed in the intake chamber, said fixed scroll including a compression chamber, an inlet, and a discharge outlet; said compression chamber further including an orbiting scroll disposed therein and a coupling shaft engaging at a bottom of the orbiting scroll to engage the axis of the orbit coupling balance assembly, thereby the orbiting scroll is rotatably driven by the rotary plate for operation.

* * * * *